United States Patent
Boyd et al.

(10) Patent No.: US 7,624,770 B2
(45) Date of Patent: Dec. 1, 2009

(54) INTELLIGENT COMPRESSOR STRATEGY TO SUPPORT HYDROGEN FUELING

(75) Inventors: Robert Walter Boyd, Orinda, CA (US); David Grant Wardle, Tadworth (GB); Kelly R. Leitch, Alexandria, VA (US); Satish S. Tamhankar, Scotch Plains, NJ (US); Gary Peter Lomas, Petersfield (GB)

(73) Assignee: The BOC Group, Inc., Murray Hill, NJ (US)

( * ) Notice: Subject to any disclaimer, the term of this patent is extended or adjusted under 35 U.S.C. 154(b) by 545 days.

(21) Appl. No.: 11/234,431

(22) Filed: Sep. 23, 2005

(65) Prior Publication Data

US 2006/0118575 A1    Jun. 8, 2006

Related U.S. Application Data

(60) Provisional application No. 60/612,622, filed on Sep. 23, 2004, provisional application No. 60/612,625, filed on Sep. 23, 2004.

(51) Int. Cl.
*B65B 1/20* (2006.01)
*F17C 13/00* (2006.01)

(52) U.S. Cl. .............................. 141/11; 141/82; 141/98; 141/231; 62/50.6

(58) Field of Classification Search .................... 141/1, 141/2, 11, 67, 82, 98, 231; 137/255; 62/46.2, 62/50.6, 50.7
See application file for complete search history.

(56) References Cited

U.S. PATENT DOCUMENTS

| | | | | |
|---|---|---|---|---|
| 5,370,159 A * | 12/1994 | Price | .............................. | 141/4 |
| 5,385,176 A * | 1/1995 | Price | .............................. | 141/1 |
| 5,409,046 A * | 4/1995 | Swenson et al. | ............... | 141/11 |
| 6,305,442 B1 * | 10/2001 | Ovshinsky et al. | .......... | 141/231 |
| 6,745,801 B1 * | 6/2004 | Cohen et al. | ................. | 141/231 |
| 6,912,450 B2 * | 6/2005 | Fairlie et al. | ................. | 700/273 |
| 7,128,103 B2 * | 10/2006 | Mitlitsky et al. | ............. | 141/248 |
| 7,287,558 B2 * | 10/2007 | Hobbs | .......................... | 141/97 |
| 7,314,056 B2 * | 1/2008 | Yamashita et al. | ........... | 137/255 |

* cited by examiner

Primary Examiner—Timothy L Maust
(74) Attorney, Agent, or Firm—Philip H. Von Neida

(57) ABSTRACT

Multi compressor systems and apparatuses for the manufacture, storage and dispensing of manufactured hydrogen fuel to hydrogen vehicle tanks or remote mobile refuelers are disclosed.

4 Claims, 6 Drawing Sheets

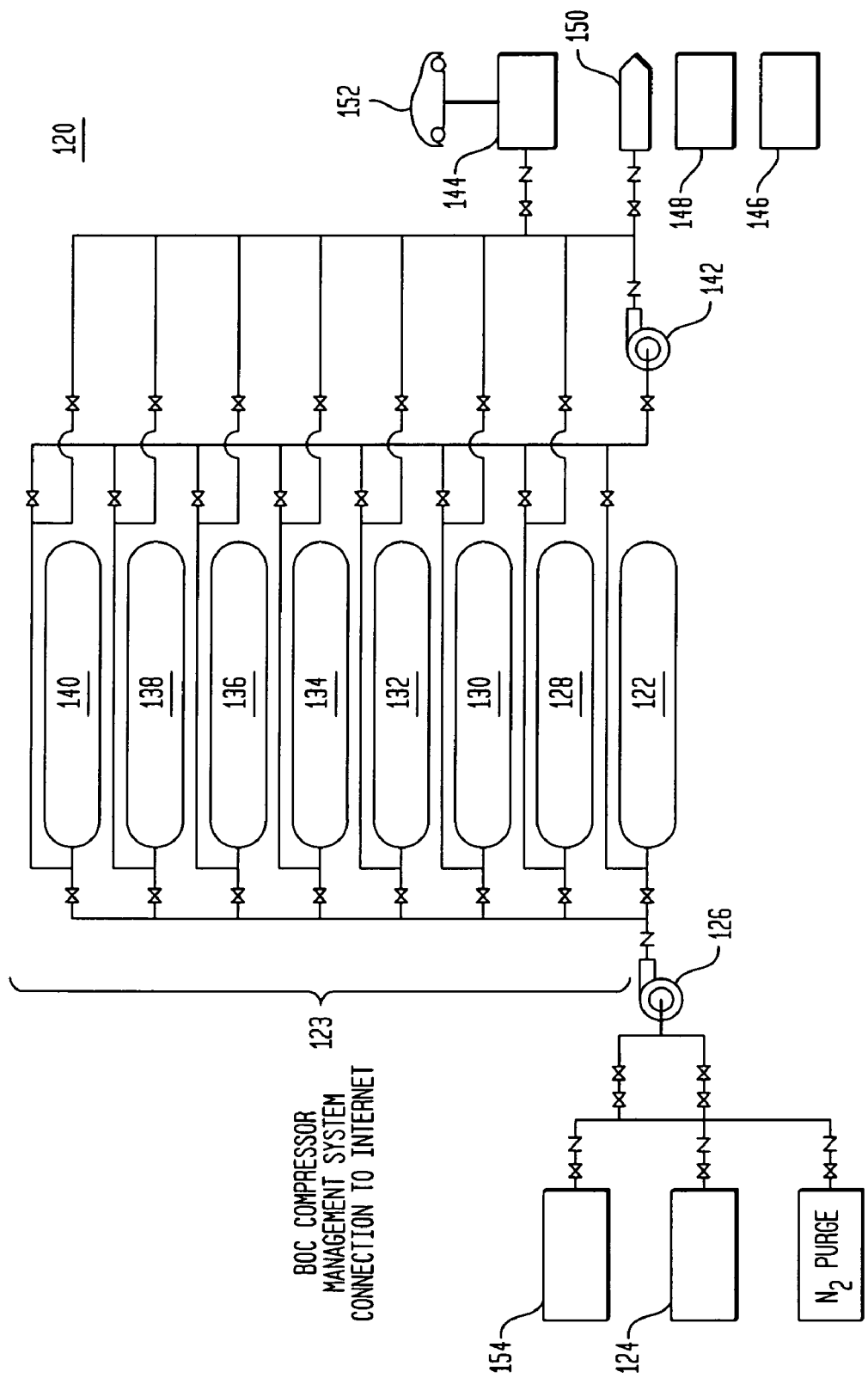

INTELLIGENT COMPRESSOR STRATEGY TO SUPPORT HYDROGEN FUELING

CROSS-REFERENCE

This application claims benefit of priority to U.S. Provisional Application Nos. 60/612,622, and 60/612,625, both filed Sep. 23, 2004.

FIELD OF THE INVENTION

The present invention relates generally to a system and apparatus for mobile, modular hydrogen vehicle fueling systems. More specifically, the present invention relates to modular vehicle fueling station systems and an intelligent compressor strategy and data collection, and station control system to support hydrogen vehicle fueling stations.

BACKGROUND OF THE INVENTION

When hydrogen is produced or purified from a pipeline supply, and delivered locally to support the fueling of hydrogen powered vehicles, a compressor must be sized to accommodate the mass flow and discharge pressure of the hydrogen generator, purifier or local source, at some multiple of the average hydrogen vehicle demand. Known systems, use one multi-stage compressor to take on-site hydrogen from the output pressure of the generator to the cascading storage pressures required of the vehicle dispensing system. However, for hydrogen vehicle refueling to be entirely useful on a larger, commercial scale, locally produced or purified hydrogen fuel must be manufactured at or near the maximum capacity of the production system, stored in sufficient quantities, and then delivered to the point of use (the vehicle dispenser) efficiently, and promptly, at a mass flow rate of from about 20 to about 100 grams per second.

Known systems use a compressor to facilitate hydrogen fuel manufacture and delivery to the system and an end use at a fixed production rate and capacity that is not dependent on, or even related to the demands and requirements of the selected end use (e.g. capacity and flow rate, etc.). However, one recognized problem with the known hydrogen fuel manufacturing and delivery systems is that the end use demand and requirements are often different from the condition and capacity of the manufactured hydrogen fuel. That is, while a manufacturing system may be designed to produce hydrogen fuel at a fixed rate, pressure and capacity, the end use, or delivery phase of the system has very different requirements. The present invention is directed to fulfilling the need of a practical and efficient hydrogen production and delivery system.

SUMMARY OF THE INVENTION

According to one embodiment of the present invention, a novel modular refueler has been devised to store and dispense locally manufactured or delivered hydrogen, preferably to hydrogen-powered vehicles or portable hydrogen containers. According to one embodiment, the present invention relates to a method for refueling hydrogen vehicles comprising the steps of providing a hydrogen source having an output attached to a refueling system and directing hydrogen from the hydrogen source at a controllable, predetermined and variable rate into the refueling system. A compressor is provided in communication with the source output with product directed from the source to the first compressor. A cascading processing array is provided in communication with the refueling system and product is directed from the compressor to a cascading processing array. A local hydrogen generator or purifier having communication with an inlet to the refueling system and having an outlet in communication with a dispenser inlet is provided. In one embodiment, an amount of hydrogen product is directed from the compressor to a hydrogen storage chamber, and then directed from the storage chamber to a dispenser adapted to fuel a hydrogen powered vehicle or portable hydrogen storage system. In another embodiment, the hydrogen product is directed to a dispensing unit also serving as a storage unit.

The present invention further relates to a method for refueling hydrogen vehicles comprising the steps of providing a hydrogen source having an output attached to a refueling system and directing hydrogen from the hydrogen source into the refueling system. A compressor is provided in communication with the source output with hydrogen being directed from the source to a series of compressors. A cascading processing array is provided in communication with the refueling system with hydrogen being directed from the compressor to a cascading processing array. An amount of hydrogen is then directed from the array to a dispenser for dispensing the hydrogen product to a hydrogen-powered vehicle.

Still further, one embodiment of the present invention relates to a hydrogen refueling system comprising at least two compressors with at least one compressor being dedicated to maintain required fuel flow rates to match the requirements of the hydrogen fuel end use.

BRIEF DESCRIPTION OF THE DRAWINGS

FIG. 7 is a schematic representation of an embodiment of the present invention showing an eight bank array.

DETAILED DESCRIPTION OF THE INVENTION

According to one embodiment, the present invention is directed to modular hydrogen refuelers comprising refillable modules that can accept, store and dispense manufactured, purified, or delivered hydrogen to a desired end use, such as hydrogen-powered vehicles, secondary storage facilities, or other uses. The preferred equipment of the present invention can be supplied by industry standard 16 to 45 MPa high purity hydrogen supply modules (tube trailer or MCP) and will preferably compress, store and dispense 25, 35, 50 or 70 MPa gaseous hydrogen to a fuel cell powered vehicle or internal combustion engine powered vehicles operating on hydrogen fuels. The vehicles may run on pure hydrogen, blended hydrogen and compressed natural gas mixtures or hydrogen enriched, hydrogenated, or hydrogen saturated hydrocarbon fuels, or combinations thereof. The preferred base system may be constructed of DOT approved steel storage tubes or NGV-HGV approved composite pressure vessels or tubes suitable for hydrogen storage, and can be delivered to field (on-site) locations in a filled state and ready for operation. The base module including the ISO-style frame and 16 to 95 MPa approved hydrogen storage tubes can be configured to support a variety of hydrogen vehicle fueling projects.

As stated above, the present invention is directed to fulfilling the need of a practical and efficient hydrogen production and delivery system. The present invention overcomes the recognized problems with the known hydrogen fuel manufacturing and delivery systems where the end use demand and requirements of vehicle fueling are often different from the condition and capacity of the hydrogen fuel manufacturing system. That is, while a manufacturing system may be designed to produce hydrogen fuel at a fixed rate, pressure and capacity, the end use, or delivery phase of the system has very different requirements. The present invention solves such compatibility problems by featuring at least one additional compressor with system responsibilities independent from the first compressor's responsibilities such that the second compressor responds to the end use system demands to condition the hydrogen product to match the demands and requirements of the particular end use, thereby increasing overall system efficiency, performance, versatility, and usefulness.

Figure 1:
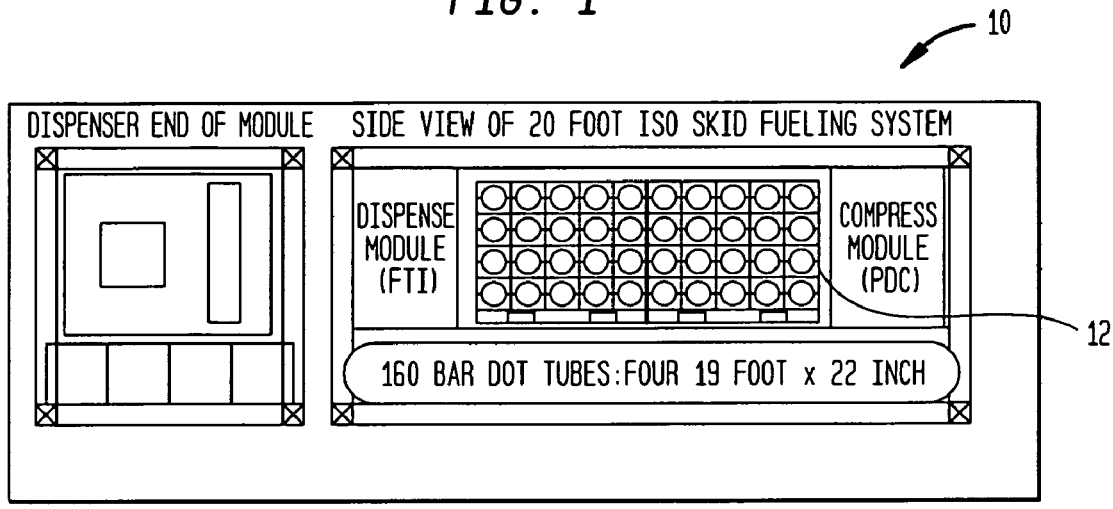
FIG. 1 is a schematic representation of a modular, transportable hydrogen vehicle fueling station system showing compression, cylinder banks and dispensing features.

As shown in FIG. 1, the optionally portable (transportable) fueling system of the present invention 10 includes 50 kg of low pressure (160 bar) hydrogen storage and up to 50 kg of high pressure (412 bar) compressed hydrogen storage in four (4) banks 12 for dispensing to vehicles at 350 bar. An option for low pressure (10 bar) auxiliary hydrogen supply is available and this may be used to power a 2 watt to 2 kw Fuel Cell or 2 to 200 kw internal combustion engine-based power supply that can support the mobile refueler. Simplified on-board dispensing equipment is standard for demonstration vehicles with optional commercial hydrogen dispensers with full CaFCP or SAE 2601 interface compliance available.

Figure 2:
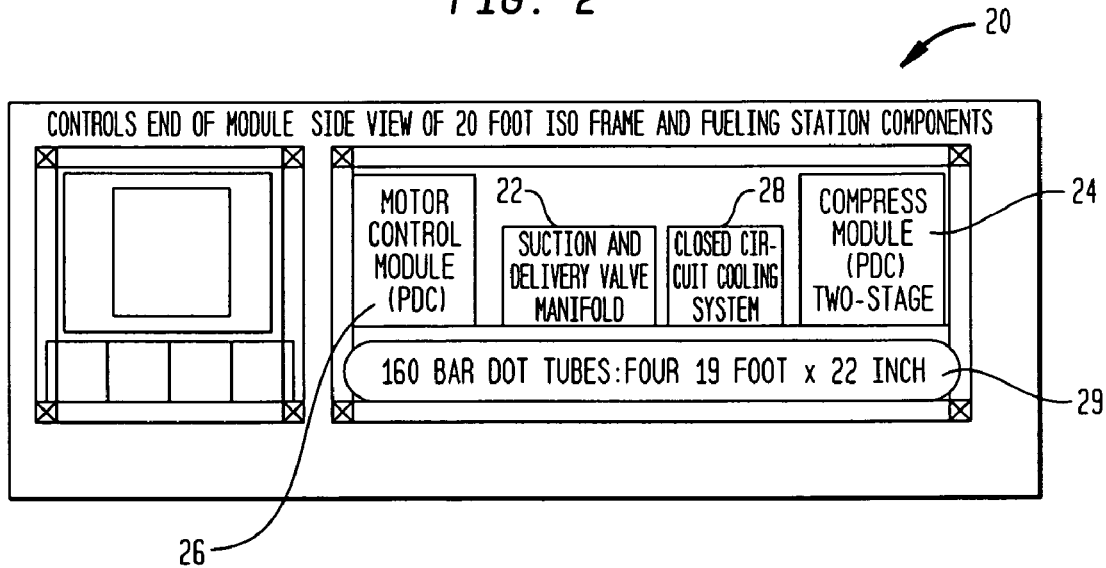
FIG. 2 is a schematic representation of an alternate embodiment of the present invention showing a modular, transportable fueling station for the delivery of manufactured hydrogen to hydrogen fueled vehicles.

FIG. 2 shows a further embodiment 20 of the present invention including system charging valves, and fill valve manifold and secure fill valve manifold lock-out box to prevent unauthorized access 22. An integrated safety relief valve manifold with common discharge to a safe location is preferably incorporated. The inventive modular refueling system further comprises an multi-stage integrated compressor 24. The compressor motor controls suction and discharge valve manifold assemblies. A motor control module 26 for regulating operation is shown along with a closed circuit integrated cooling system 28. The storage tube array 29 is shown in a position along the base of the unit, but such orientation is not required. Further, the system can be filled at one site and transported in a filled state.

Figure 3:
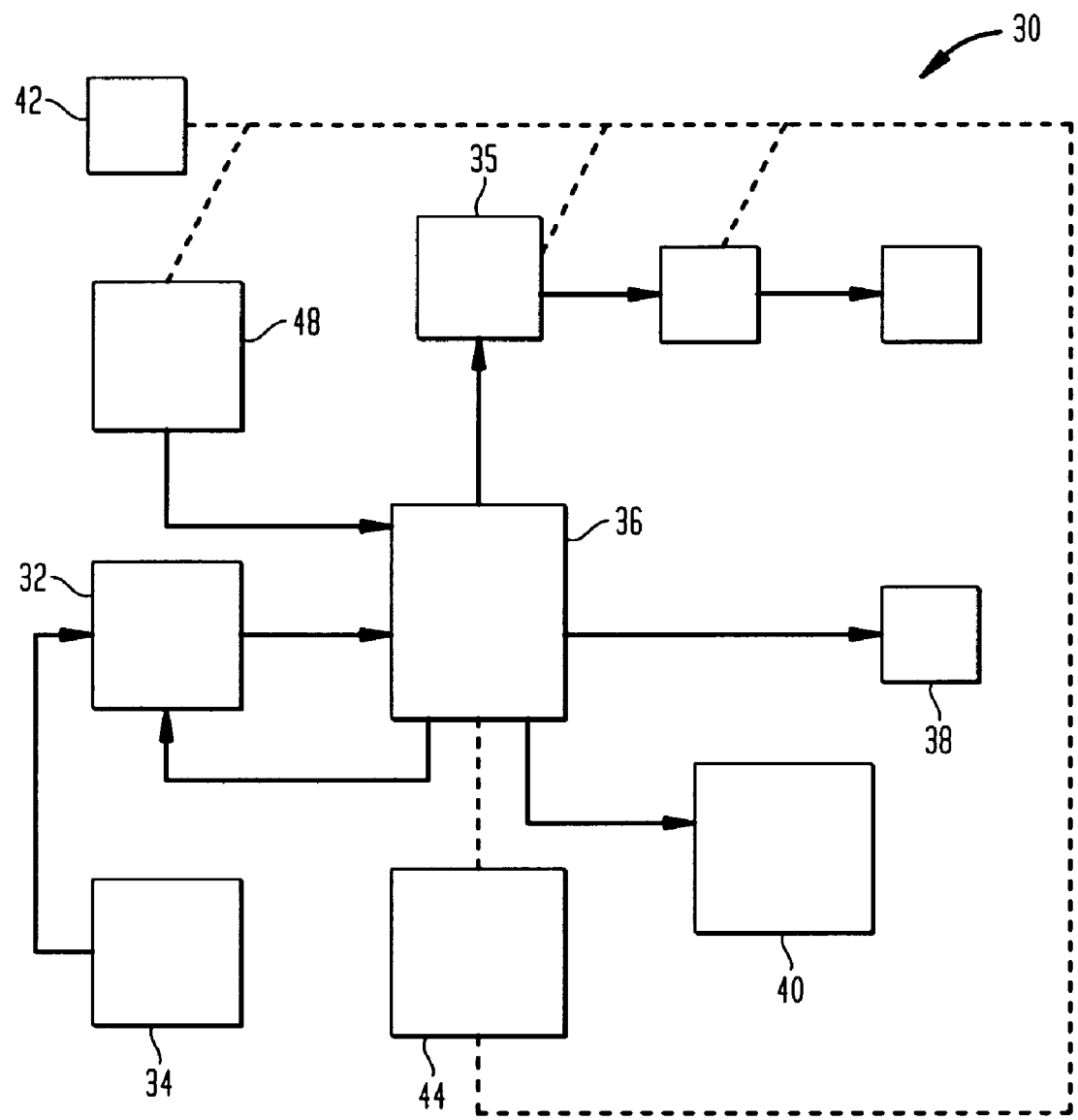
FIG. 3 is a schematic representation of one embodiment of the present invention showing an entire fueling station system with gas manufacturing with single compressor, master station control system, compressed storage systems and delivery capabilities.

FIG. 3 shows one embodiment of the present invention where, in a novel hydrogen refueling system 30, hydrogen is supplied from an on-site production system 48 or from pressurized hydrogen processing cylinder banks (e.g. 200 to 2000 psig) or to a compressor via stainless steel tubing and sent to the high pressure (eg 6000 psig) cylinder banks at a higher pressure, or, when the required pressure has been obtained to support vehicle dispensing, the hydrogen is sent to the low pressure storage 32 to build inventory while the generator is operating. Additionally, hydrogen may be dispensed via 6000 psig portable cylinder pallet packs for delivery to a remote fueling location to be transported under pressure (e.g. 6000 psig), or a mobile refueler that may be self-powered for delivery of the processed hydrogen fuel to a remote use. The hydrogen may be transported or stored under any useful pressure, but is shown under 6000 psig of pressure. As shown in FIG. 3, hydrogen is supplied to the steel tubes 32 via hydrogen provided by mobile tube 34. The hydrogen is directed from tubes 32 to a system compressor 36 that provides and regulates system delivery demands as the hydrogen is directed 1) to a high pressure storage system 35 and vehicle dispensing system, 2) a further tube array 38 (6000 psi pallet pack), 3) an alternate mobile refueler or other high pressure end use 40 (6000 psi), or 4) to intermediate pressure storage via the 200 to 2000 psi tubes 32. The entire system may be managed via remote access such as via the internet 42 as a controller could activate, regulate or otherwise monitor the system remotely, activating the system controls 44. The system, as shown, further incorporates a video capability 46. According to FIG. 3 the system contemplates the hydrogen fuel generation as a source via electrolyzer 48, but other production means are equally applicable.

Figure 4:
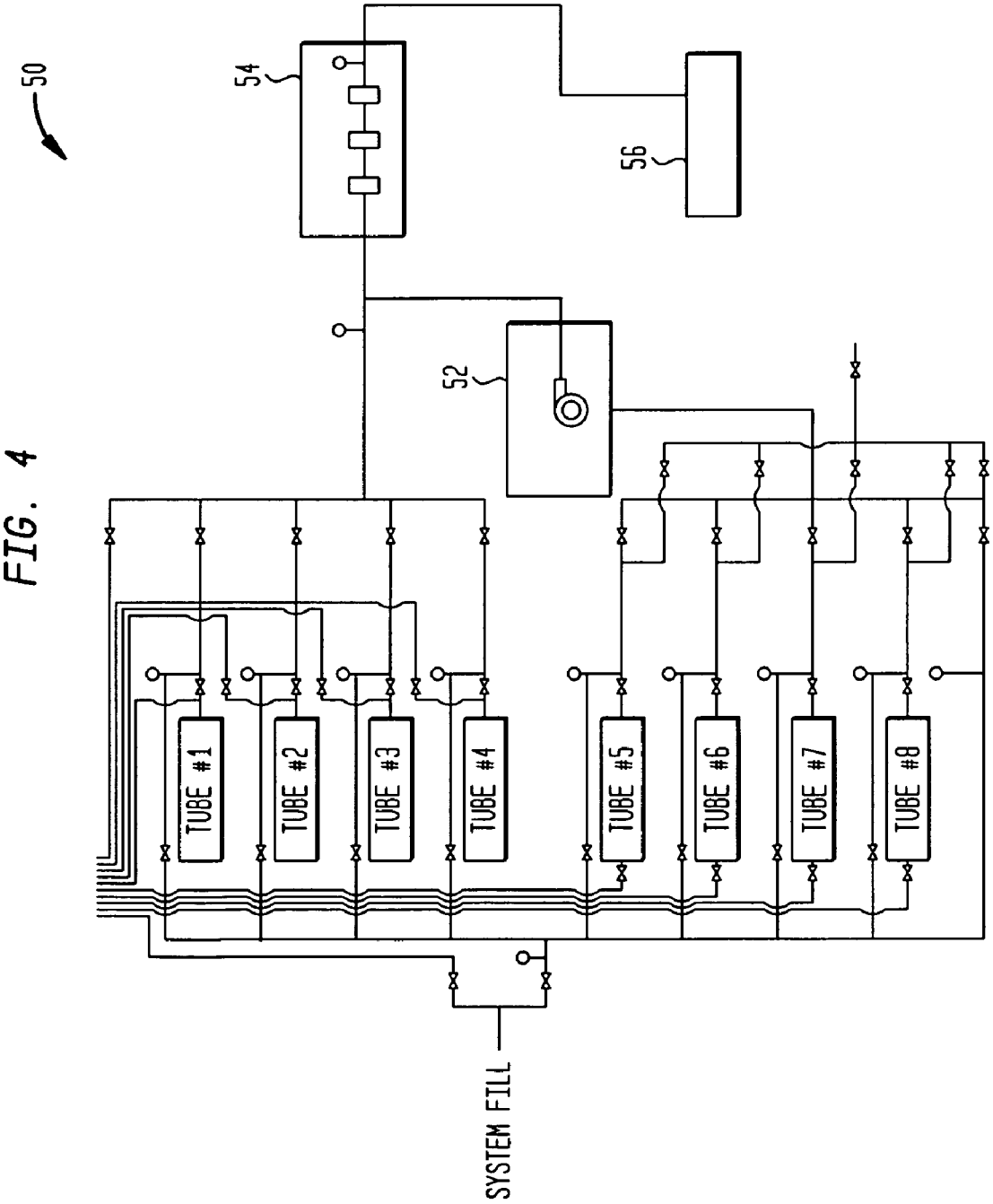
FIG. 4 is a schematic representation of the present invention showing an eight cylinder bank for the management of compressed hydrogen for dispensing to hydrogen fueled vehicles and/or mobile fueling stations.

FIG. 4 shows one aspect of the hydrogen manufacture and delivery system of the present invention 50 whereby source hydrogen is directed to the processing cylinders (eight (8) are shown) that are pressurized and conditioned for use in a cascading array. Hydrogen is directed from the source directly to, or via a cylinder to a compressor 52 that further pressurizes the hydrogen up to a predetermined and desired pressure. Upon demand, processed hydrogen of a desired and conditioned usage pressure is directed from the cylinder/tube, typically in the order of lowest pressure first, to a dispenser 54 properly fitted with dispensing equipment to fill a hydrogen-powered vehicle 56.

Figure 5:
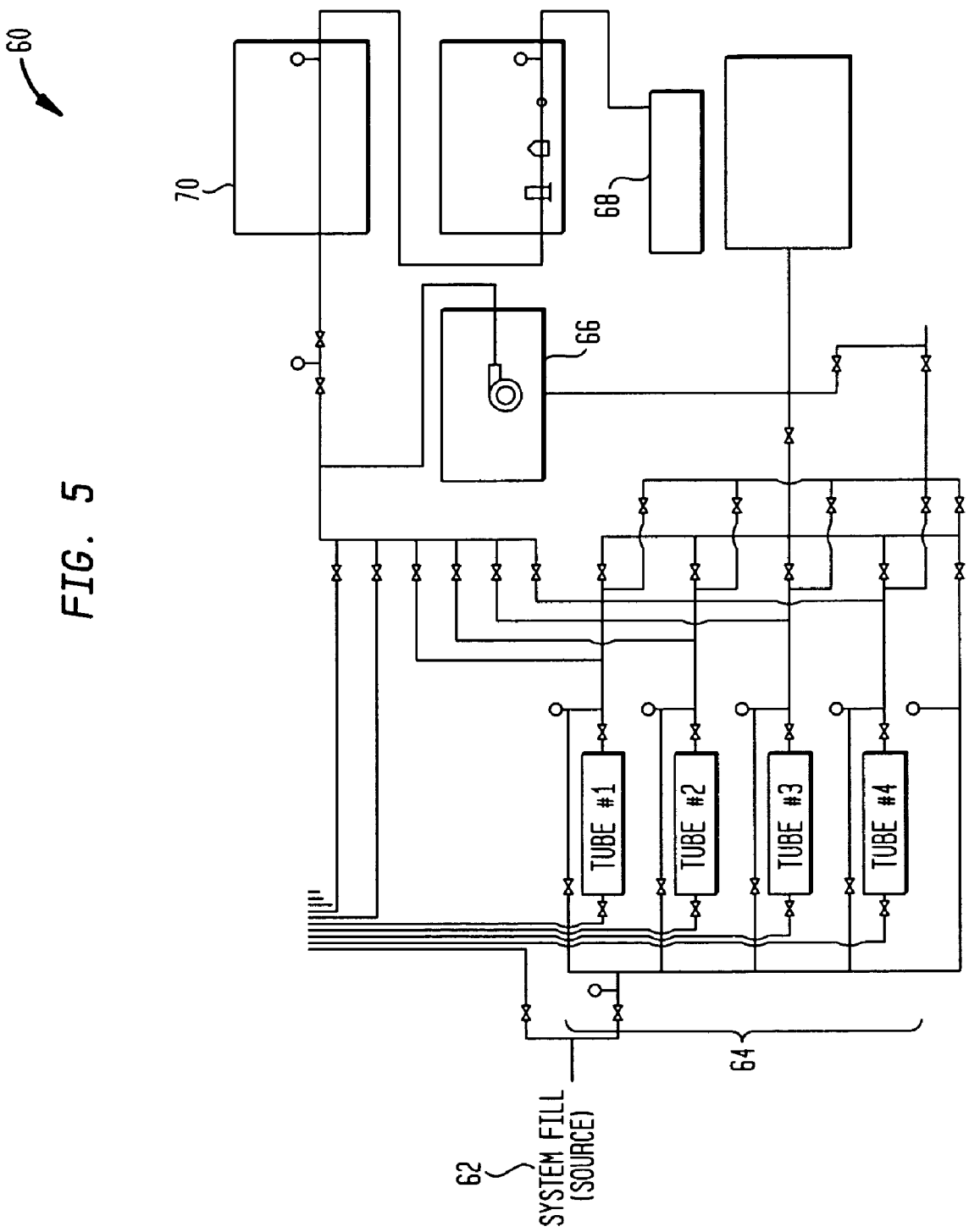
FIG. 5 is a schematic representation of the present invention showing a four cylinder bank for the management of compressed hydrogen storage of locally produced hydrogen for dispensing to hydrogen fueled vehicles and/or mobile fueling stations

FIG. 5 shows another embodiment 60 of the present invention whereby hydrogen from a mobile supply or source 62 is conditioned through a processing cylinder/tube cascading array 64 in concert with a compressor 66 to achieve hydrogen fuel at desired pressures. Upon demand, the hydrogen fuel is directed from the cylinder array to a dispenser for distribution to a hydrogen-powered vehicle 68, via the high pressure hydrogen storage facility 70. When the system storage is at capacity, fueling can occur via release from storage 70, with the storage then replenished by the compressor refilling the storage 70 with locally generated product, or from fuel stored in the cascading array 64. As shown in FIG. 5, further auxiliary use for hydrogen fuel via a separate outlet is further contemplated.

Figure 6:
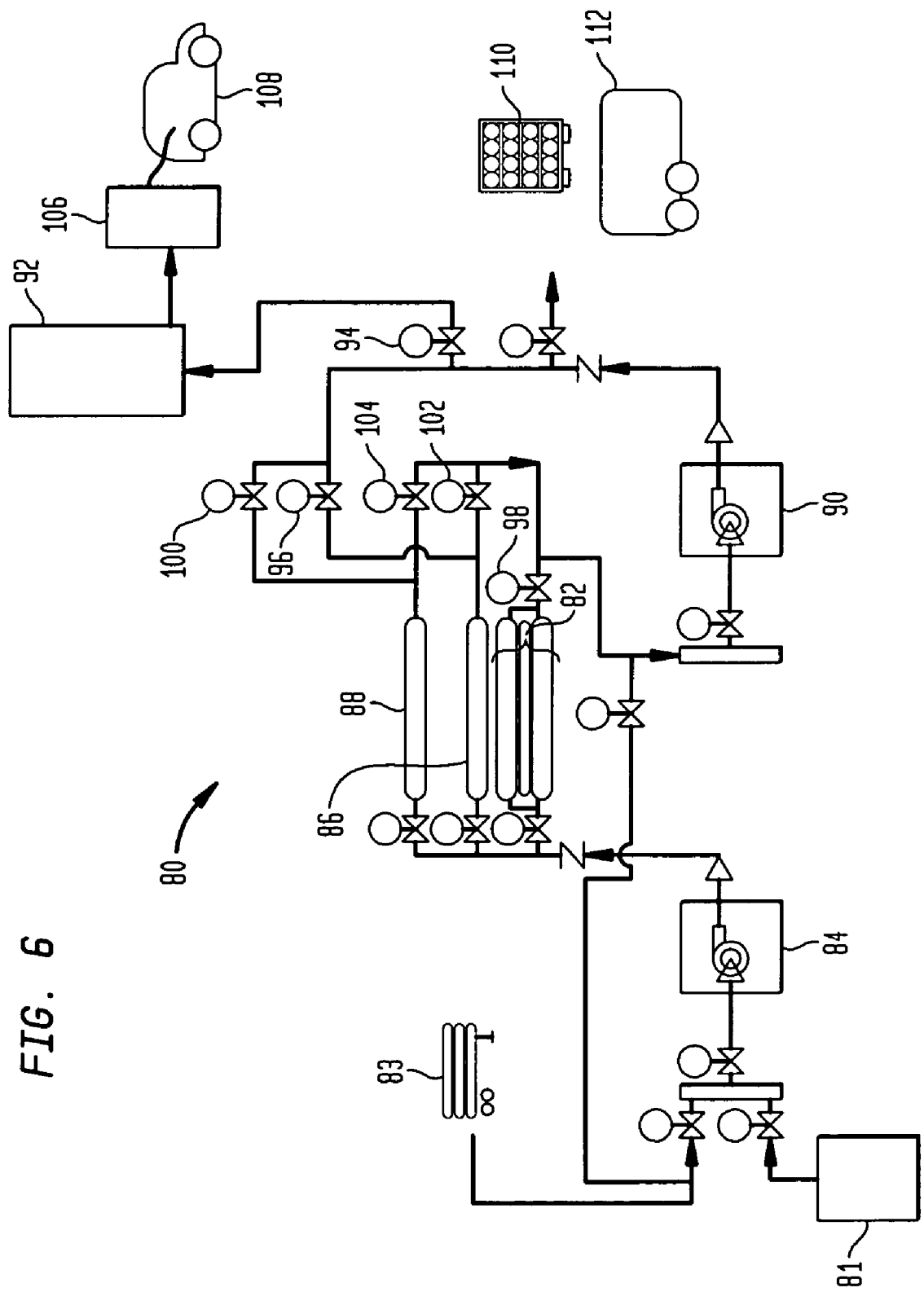
FIG. 6 is a schematic representation of one embodiment of the present invention showing a process flow diagram of the fuel storage and dispensing features of the Intelligent Compression System having multiple compressors and providing fuel for hydrogen fueled vehicles and mobile, modular refueling systems.

FIG. 6 shows a further embodiment 80 of the present invention whereby multiple compressors are employed in the hydrogen fuel manufacturing system to achieve a desired faster fill and production rate. According to this embodiment of the present invention, a hydrogen vehicle refueling system and apparatus 80 are conceived comprising a multiple buffer storage system that uses two single stage compressors that are capable of being operated over a wide range of conditions and can be designed to match any hydrogen generation system with any desired dispensing requirements. Such "intelligent" compression systems can be linked into a local area network of hydrogen generation, compression, storage and dispensing modes.

In this arrangement, as shown in FIG. 6, bank 82 will be the lowest pressure bank, and the primary destination for product from the generator 81 or storage 83 through the first compressor 84. Banks 86 and 88 may be charged by the first compressor 84, or can be pushed to a higher pressure by the second compressor 90 pulling product from bank 82. The first compressor 84 will be able to charge bank 88, then bank 86, and finally bank 82, but under normal conditions will only operate when the generator 81 is running. First compressor 84 will only be able to supply a pressure of about 1500 psig to the banks. The second compressor 90 then provides the desired pressure to banks 86 and 88, and can charge to the high pressure hydrogen storage chamber 92 or the auxiliary storage system (not shown) at required and desired pressures of up to about 6000 psig (about 450 bar), for example.

The high pressure hydrogen storage chamber 92 is filled by opening bank valves 94, 96, and 98 and turning on the second compressor 90. At this point, bank 86 pressure is equalized with the high pressure hydrogen storage chamber 92 and the second compressor 90 that fills the high pressure hydrogen storage chamber 92 and bank 86 with the product from bank 82. Valve 96 is turned off, and valve 100 is turned on. Valve 98 is turned off, and valve 102 is turned on to effect bank 88 equalizing with the high pressure hydrogen storage chamber 92 and bank 88 with the product from bank 86. Valve 96 is then turned off to effect the second compressor 90 filling the high pressure hydrogen storage chamber 92 with product from bank 86. If valve 104 is turned on and valve 102 turned off, the second compressor 90 fills the high pressure hydrogen storage chamber 92 with product only from bank 88. When the high pressure hydrogen storage chamber 92 is full, valve 96 is opened, valve 94 is closed, valve 98 is opened and valve 104 is closed to effect the second compressor 90 filling bank 88 with product from bank 82. When bank 3, 88 is filled, valve 100 is opened and valve 96 is closed to effect the second compressor 90 filling bank 86 with product from bank 82. When bank 86 is full, the second compressor 90 is shut off. As shown in FIG. 6, the product stored in the high pressure hydrogen storage chamber 92 is directed to dispenser 106 for purposes of fueling a hydrogen vehicle 108. FIG. 6 further shows the ability of the system to fill auxiliary storage units (the 450 bar MCP 110) as well as mobile refueler 112 (450 bar mobile refuelers), or other desired end uses. When necessary, such as at times of demand, auxiliary hydrogen may be provided (to the system via auxiliary storage), to assist in the hydrogen generation.

The above arrangement set forth will result in a greater capacity to fuel vehicles, than if only one compressor had been used to supply the high pressure hydrogen storage system from the local hydrogen generator, liquid hydrogen storage, delivered compressed hydrogen or other low pressure hydrogen sources. The present invention further contemplates the use of pressure regulators to control vehicle or portable pressure vessel fill rates such that the pressure rise rate is controlled from about 1 to about 10 bar per second when equalizing the stored hydrogen to high pressure portable or vehicular hydrogen storage vessels.

The portability of the modular refueling systems of the present invention provide significant advantages over known systems. As hydrogen-fueled, low emission vehicle fleets emerge, the ability to support hydrogen fuel activities at a low cost and with minimal regulatory (permitting) efforts with the local and federal permitting authority will be seen as being highly advantageous. The refueling systems of the present invention support fuel transfer to hydrogen vehicles' on-board storage system filling at pressures from about 3000 to 12,000 psig (about 250 to about 700 bar settled pressure).

The refueling modules of the present invention are able to be self-powered (no need for external power supply) when the low pressure hydrogen reserves are used to operate FC or ICE power supplies operating on hydrogen. The present systems can use standard low pressure hydrogen supply system controls, or low pressure (9 bar) hydrogen as a pneumatic operating media controlling valve positioning devices and pneumatically operated valves. Further, the inventive systems of the present invention comprise multiple compressor power supply options such as 1) grid power; 2) a 3 phase, 2 to 200 kW hydrogen powered generator system, base on a $H_2$ICE genset or fuel cell power supply; and 3) $H_2$ICE genset with mechanical or hydraulic power take of (PTO) and direct drive for the hydrogen compression system. Still further, the systems of the present invention contemplate high manufacturing, storage and dispensing capacity, with direct-to-vehicle dispensing systems for, for example, 350, 500 and 700 bar hydrogen vehicle fueling.

One critical function of any useful hydrogen vehicle fueling station is to deliver hydrogen to the vehicle fuel tank at a sufficiently high flow rate of up to from about 20 to about 100 grams per second, and to achieve about 95 to about 98% of the design fuel capacity (measured as the settled pressure of the fuel tank equilibrated to 15° C.). According to the present state of the art, to achieve this, hydrogen may be pre-compressed and delivered to the vehicle, cascading from a storage bank system, or the compressor can be sized to fill the vehicle tank directly. When hydrogen is produced or purified locally, a compressor is sized to accommodate the mass flow and discharge pressure of the generator or purifier. Although it is possible to use one compressor to take locally generated or purified hydrogen from the output pressure of the generator or purifier to the cascading storage pressures required of the dispensing system, it has now been discovered that significant operational advantages are achieved by providing a two stage compression system with an intermediate buffer storage.

According to the present invention, a hydrogen vehicle refueling system and apparatus is conceived comprising a multiple of buffer storage systems that preferably uses at least two single-stage or multi-stage compressors that are capable of being operated independently over a wide range of conditions and can be designed to match any hydrogen generation system with any desired and varied dispensing requirements. Such "intelligent" compression systems can be linked into a local area network of hydrogen generation, compression, storage and dispensing nodes and load sharing systems employed to match local demand with local production capacity and trucked in hydrogen supplies.

The present invention therefore further contemplates the use of the intelligent compressor strategy set forth above to match electrolytic hydrogen generation and the high pressure hydrogen supplied high pressure storage system and hydrogen vehicle fuel dispensing as an integrated, packaged system including gas-conditioning, controls and cooling systems, etc. The two compressor system disclosed herein preferably features a primary compression of on-site generator hydrogen produced at the rated (net) electrolyzer output of about 13.0 N-m$^3$/hr (28 kg/day) with enhanced primary compression capacity of up to about 39 N-m$^3$/hr (84 kg/day), for example, by using an imported compressed hydrogen supply. The preferred system further contemplates incorporating secondary compression or up to about 450 bar at rates up to about 8 kg/hr to accommodate fueling of fuel cell vehicles as well as heavy-duty vehicles powered by, for example, hydrogen internal combustion engines.

According to one embodiment, to best support on-site hydrogen generation systems, a primary compressor is preferably matched to the flow rate and discharge pressure of the hydrogen generation or purification system. Regardless of the operational status of the on-site generation or purification system, the secondary compressor can be supplied with compressed hydrogen from low-pressure buffer storage (or delivered hydrogen) and discharged to high-pressure storage at elevated mass flow rates. According to one embodiment of the present invention, when the high-pressure banks drop below an optimum vehicle fueling pressure, the secondary compressor is operated to top off the high-pressure buffer. When the hydrogen buffer storage is depleted to a lower limit to accommodate the operational cycle of the production system, the hydrogen production unit will be switched from idle to operative and both stages of compression will operate to fill the high and low storage buffers.

As shown in FIG. 6, the preferred hydrogen storage banks comprise tube bundles for the compressor system having a nominal capacity of from about 20 to about 100 kg of hydrogen storage in 160 bar steel tubes or 200 to 450 bar composite storage system with a compressor system that serves as a low pressure compressed gas storage buffer. The use of a low pressure buffer system operating between 10 and 250 bar will allow the dispenser system high-pressure gas storage to be recharged from gas stored in the low pressure buffer without starting the electrolyzer or other local hydrogen generation equipment, and will thus allow for hydrogen production at night when the power rates are typically lowest. This will allow for the requirement to top off the 450 bar high-pressure storage system to be independent from the operation of the compressor that is sized to match the generator.

The fill system for the low-pressure buffer will also serve as a connection for the auxiliary tube trailer supply that will be used for commissioning and could be used for back-up or to otherwise supplement the on-site hydrogen generation system. The low-pressure (100 to 450 bar) storage buffer can be periodically depleted to allow the secondary compressor to run without starting the electrolyzer. This will allow the on-site production system to run as long as possible once it starts. The low-pressure storage buffer is preferably made from DOT approved steel storage tubes, that can be periodically inspected with ultrasonic testing procedures, or composite vessels that meet NGV or HGV specifications Further the hydrogen gas storage buffers can be constructed from 250 to 700 bar hydrogen storage system commercially available as hydrogen vehicle fuel storage vessels, such as those produced by Dynetek Industries (Calgary, Alberta, Canada).

As set forth in FIG. 6, the system of the present invention is contemplated to be linked with necessary control systems, including internet based controllers and reporting tools, and functions to implement cost-effective internet-based project management tools to provide the maximum possible benefits on-site, while minimizing travel, actual inspection, etc. Through the use of the Internet coupling with the system of the present invention, remote monitoring, control, service, dispensing, and other informational functions, including visual link and data acquisition, etc. will be achievable. It is therefore contemplated that the systems of the present invention integrate programmable logic controllers (PLCs) that will coordinate the system operation, such as compressor operating sequence with the dispenser, high-pressure storage buffer and electrolyzer operations, etc. The preferred system further incorporates station control systems that could feature a local human-machine interface to the various components of the system, as well as the internet Transmission Control Protocol (TCP)/Internet Protocol (IP) linked connection to the local data acquisition, data recording and system utilization, and power management systems. Further, all appropriate safety implementations are contemplated as being integrated into the preferred systems of the present invention.

While one embodiment of the present invention as shown in FIG. 6 contemplates a two compressor system, it is understood that a plurality of any number of compressors could be used as desired, and as is practical to the demands of the particular hydrogen refueling system design. Similarly, the systems of the present invention are in no way limited to a specific number of buffers or storage units, but instead may be customized as would become apparent to one skilled in the field of gas manufacture and delivery in light of the teachings herein.

The dispenser made to interface with the system of the present invention is preferably a dispenser useful for the delivery of hydrogen to vehicles, and therefore any design made to safely transfer the hydrogen fuel from a storage system to a vehicle tank is contemplated. As shown in FIG. 6, the present invention further contemplates the use of the system of the present invention to further fill mobile refueling units capable themselves of storing and dispensing hydrogen fuel remotely, or as otherwise desired. In addition, the systems of the present invention further contemplate the use of the inventive systems described herein to deliver product fuel to remote locations, or to fill additional storage facilities that will remain on-site, or be moved for use remotely.

In a further embodiment, the present invention contemplates a refueling station physical orientation that integrates all or portions of the cascading cylinder/tube array and/or the storage facility, for example, into a canopy or other overhead structure or other structure located proximate to the fuel dispensing island. In this way, a service station-type orientation is achieved whereby the hydrogen-powered vehicle stops for fuel, preferably under a canopy to protect the driver and vehicle from sun or inclement weather. However, in this embodiment the canopy serves a multi-functional role, by also housing components of the hydrogen manufacturing and/or storage and/or dispensing system.

As with the system shown in FIG. 6, it is understood that the intelligent system comprises contemplated connection to the internet for purposes of control filling and dispensing, as well as monitoring the supply, demand, etc. such that the hydrogen generation is shut off in times of low demand, and activated along with the release of supplemental hydrogen source from storage supply tanks at times of high demand. When the system has produced excess hydrogen outpacing demand, the hydrogen generation may either be stopped or supplemental refuelers can be summoned to offload hydrogen fuel supply for use at remote locations. As shown, the system has no safety systems running through the Internet, although such systems could be adapted. Such Internet links will further facilitate training functions, whereby, video links can display fueling and provide consumption and supply and usage readouts for use by local officials, safety and transportation departments and other suitable agencies, (e.g. fire and police departments, etc.). The hydrogen fuel is preferably dispensed to vehicles according to accepted methods SAE J2600 and SAE J2601 and developing CSA-ANSI standard HGV-1.

The present invention therefore further contemplates the use of the intelligent compressor strategy set forth above to match a local electrolytic hydrogen generation system or hydrocarbon fuel processor-based hydrogen production system, and the high pressure hydrogen demand from the high pressure storage system and hydrogen vehicle fuel dispensing as an integrated, packaged system The contemplated systems of the present invention include gas-conditioning, controls and cooling systems, etc. as would be apparent to one of ordinary skill in the field of gas manufacturing and delivery in light of the teachings herein.

One representative system 120 (70) of the hydrogen refueling system according to the present invention is set forth in FIG. 7. In this arrangement, bank 1, 122 of the eight bank array 122 will be the lowest pressure bank, and the primary destination for product from the generator 124 through the first compressor 126. Hydrogen storage banks 2 through 8 (128 through 140 respectively), may be charged by the first compressor 126, or can be pushed to a higher pressure by the second compressor 142 pulling product from bank 1, 122, or any of the lower pressure banks with bank 1, 122 being the lowest and bank 8, 140 the highest pressure bank. The first compressor 126 will be able to charge banks sequentially but under normal conditions will only operate when the generator 122 is running. As with known systems, the first compressor 126 is only be able "bump up" the hydrogen supply in the lower pressure banks to an intermediate pressure, far less than what is needed for dispensing to vehicles at a commercially acceptable rate. The second compressor 142 then provides the full system pressure to banks 2, 128 through banks 8, 140 and may charge directly to the vehicle dispenser 144 or to the mobile refueler 146 or multi-cylinder packs 148 (86) or other uses, via a future connection 150 at required pressures of up to about 6000 psig (about 450 bar) or higher when fueling 700 bar vehicles to about 12,500 psig.

The high pressure hydrogen storage system 120 can thus serve both as an intermediate storage buffer for hydrogen being supplied by the first compressor 126 from the local hydrogen generation system, and serve as a high pressure storage banks that can supply the vehicle dispensing demands and auxiliary high pressure storage systems.

As shown in FIG. 7, the product stored in the high pressure hydrogen storage array 123 may be directed to a dispenser 144 for purposes of fueling a hydrogen vehicle 152. FIG. 7 further shows the ability of the system to fill auxiliary storage units including the 450 bar MCP 148 as well as 450 bar mobile refueller mobile refuelers 146, or other uses. When necessary, such as at times of demand, auxiliary, backup or supplemental hydrogen may be provided to the system via auxiliary storage 154, to assist in matching the vehicle fueling demand of the capacity of the local hydrogen generation system.

To best support on-site hydrogen generation systems, a primary compressor is preferably matched to the flow rate and discharge pressure of the electrolyzer or hydrocarbon fuel processor (hydrogen generation system). Regardless of the local hydrogen production unit's operational status, the secondary compressor can be supplied by low-pressure buffer compressed hydrogen storage (or delivered hydrogen) and discharged to high-pressure storage at elevated mass flow rates. According to one embodiment of the present invention, when the high-pressure bank drops below an optimum vehicle fueling pressure, the secondary compressor is operated to top off the high-pressure buffer. When the low-pressure buffer storage is depleted, the electrolyzer will be switched from idle to operative and both stages of compression will operate to fill the high and low storage buffers.

According to embodiments of the present invention, the fill system for the low-pressure buffer will also serve as a connection for the auxiliary tube trailer supply that will be used for commissioning and could be used for back-up or to otherwise supplement the on-site hydrogen generation system. The low-pressure (160 to 250 bar) storage buffer can be periodically depleted to allow the secondary compressor to run without starting the electrolyzer. This will allow the electrolyzer to run as long as possible once it starts. The low-pressure storage buffer is preferably made from steel storage tubes, and can be ultrasonically inspected and hydrostatically tested. Further the low-pressure storage buffer can be a 250 bar hydrogen storage system composite tube fabrication (metal liner with carbon fiber overwrap) commercially available, such as those produced by Dynetek Industries (Calgary, Alberta, Canada).

With regard to the modularity of the storage facilities and filling the modular units, it is understood that the a single compressor system could be used in concert with the cascading regimen. However, as presented herein, the two-stage compressor system is preferable, even for this aspect of the present invention, for purposes of efficiency and full utilization of the usefulness of the present invention. As stated above, it is also understood that any number of compressors, in excess of two, could be employed.

While the present invention has been described in terms of what are thought to be preferred embodiments, it is understood that the invention is not limited to the embodiments presented, but, instead, the present invention is intended to cover various modifications and equivalents included within the spirit and scope of the appended claims presented herein and eventually presented in subsequently filed provisional or utility applications.

We claim:

1. A method for refueling hydrogen vehicles comprising the steps of:
   providing a hydrogen generator having an output attached to a refueling system;
   manufacturing hydrogen-containing product via the generator and directing product from the generator into the refueling system;
   providing a first compressor, said first compressor in communication with the generator output;
   directing hydrogen from the generator to the first compressor;
   providing a cascading processing array in communication with the refueling system;
   directing hydrogen from the first compressor to a cascading processing array;
   providing a second compressor in communication with the refueling system;
   directing pre-selected amounts of hydrogen from the cascading processing array to the second compressor; and
   directing pressurized hydrogen from the second compressor to the cascading processing array.

2. The method according to claim 1, further comprising the step of directing pressurized hydrogen from the second compressor to a storage unit.

3. The method of claim 2, further comprising the step of directing pressurized hydrogen to a vehicle inlet.

4. The method of claim 2, wherein the storage unit is a mobile storage unit.

* * * * *